(12) United States Patent
Bankoski et al.

(10) Patent No.: US 8,798,131 B1
(45) Date of Patent: Aug. 5, 2014

(54) APPARATUS AND METHOD FOR ENCODING VIDEO USING ASSUMED VALUES WITH INTRA-PREDICTION

(75) Inventors: James Bankoski, Wynantskill, NY (US); Paul Wilkins, Cambridge (GB); Yaowu Xu, San Diego, CA (US)

(73) Assignee: Google Inc., Mountain View, CA (US)

( * ) Notice: Subject to any disclaimer, the term of this patent is extended or adjusted under 35 U.S.C. 154(b) by 551 days.

(21) Appl. No.: 13/110,193

(22) Filed: May 18, 2011

Related U.S. Application Data

(60) Provisional application No. 61/345,976, filed on May 18, 2010.

(51) Int. Cl.
    *H04N 7/50*      (2006.01)
    *G06T 9/00*      (2006.01)

(52) U.S. Cl.
    USPC .......................................... 375/240; 382/166

(58) Field of Classification Search
    USPC ....................................................... 375/240
    See application file for complete search history.

(56) References Cited

U.S. PATENT DOCUMENTS

| | | | |
|---|---|---|---|
| 5,150,209 A | 9/1992 | Baker et al. | |
| 5,708,473 A | 1/1998 | Mead | |
| 5,956,467 A | 9/1999 | Rabbani et al. | |
| 6,285,801 B1 | 9/2001 | Mancuso et al. | |
| 6,314,208 B1 | 11/2001 | Konstantinides et al. | |
| 6,473,460 B1 | 10/2002 | Topper | |
| 6,611,620 B1 | 8/2003 | Kobayashi et al. | |
| 6,621,867 B1 | 9/2003 | Sazzad et al. | |
| 6,654,419 B1 | 11/2003 | Sriram et al. | |
| 6,785,425 B1 | 8/2004 | Feder et al. | |
| 6,798,901 B1 | 9/2004 | Acharya et al. | |
| 6,807,317 B2 | 10/2004 | Mathew et al. | |
| 7,054,367 B2 | 5/2006 | Oguz et al. | |
| 7,088,351 B2 | 8/2006 | Wang | |
| 7,106,910 B2 | 9/2006 | Acharya et al. | |
| 7,116,830 B2 | 10/2006 | Srinivasan | |
| 7,158,681 B2 | 1/2007 | Persiantsev | |
| 7,197,070 B1 | 3/2007 | Zhang et al. | |

(Continued)

FOREIGN PATENT DOCUMENTS

JP      2007267414      10/2007

OTHER PUBLICATIONS

"Series H: Audiovisual and Multimedia Systems; Infrastructure of audiovisual services—Coding of moving video; Advanced video coding for generic audiovisual services". H.264. Version 1. International Telecommunication Union. Dated May 2003.

(Continued)

*Primary Examiner* — Sath V Perungavoor
*Assistant Examiner* — Howard D Brown, Jr.
(74) *Attorney, Agent, or Firm* — Young Basile Hanlon & MacFarlane P.C.

(57) ABSTRACT

A system, apparatus, and method encoding a video stream having a plurality of frames, each frame having a plurality of blocks is disclosed. The method can include selecting a current block from a current frame of the plurality of frames, the current block being in at least one of a top row or a left column of the current frame, determining one or more assumed values based on a prediction mode of the current block, creating a residual block using the current block, prediction mode of the current block, and the one or more determined assumed values, and encoding the current block using the residual block.

20 Claims, 7 Drawing Sheets

(56) References Cited

U.S. PATENT DOCUMENTS

| | | | |
|---|---|---|---|
| 7,277,592 | B1 | 10/2007 | Lin |
| 7,333,544 | B2 | 2/2008 | Kim et al. |
| 7,447,337 | B2 | 11/2008 | Zhang et al. |
| 7,466,774 | B2 | 12/2008 | Boyce |
| 7,492,823 | B2 | 2/2009 | Lee et al. |
| 7,602,851 | B2 | 10/2009 | Lee et al. |
| 7,657,098 | B2 | 2/2010 | Lin et al. |
| 7,689,051 | B2 | 3/2010 | Mukerjee |
| 8,094,722 | B2 * | 1/2012 | Wang ................. 375/240.13 |
| 8,111,914 | B2 * | 2/2012 | Lee et al. ................. 382/166 |
| 8,135,064 | B2 * | 3/2012 | Tasaka et al. ............ 375/240.16 |
| 8,200,028 | B2 | 6/2012 | Gabso et al. |
| 8,218,629 | B2 | 7/2012 | Lee et al. |
| 8,295,367 | B2 | 10/2012 | Tang et al. |
| 8,320,470 | B2 * | 11/2012 | Huang et al. ............ 375/240.27 |
| 8,369,402 | B2 * | 2/2013 | Kobayashi et al. ...... 375/240.12 |
| 2002/0017565 | A1 | 2/2002 | Ju et al. |
| 2003/0053708 | A1 | 3/2003 | Kryukov et al. |
| 2003/0053711 | A1 | 3/2003 | Kim |
| 2003/0202705 | A1 | 10/2003 | Sun |
| 2004/0001634 | A1 | 1/2004 | Mehrotra |
| 2005/0180500 | A1 | 8/2005 | Chiang et al. |
| 2006/0013315 | A1 | 1/2006 | Song |
| 2006/0215751 | A1 | 9/2006 | Reichel et al. |
| 2007/0036354 | A1 | 2/2007 | Wee et al. |
| 2007/0080971 | A1 | 4/2007 | Sung |
| 2007/0110152 | A1 | 5/2007 | Lee et al. |
| 2007/0121100 | A1 | 5/2007 | Divo |
| 2007/0140349 | A1 | 6/2007 | Burazerovic |
| 2007/0217701 | A1 | 9/2007 | Liu et al. |
| 2008/0008246 | A1 | 1/2008 | Mukherjee et al. |
| 2008/0212678 | A1 | 9/2008 | Booth et al. |
| 2008/0260042 | A1 | 10/2008 | Shah et al. |
| 2008/0298472 | A1 | 12/2008 | Jain et al. |
| 2009/0161763 | A1 | 6/2009 | Rossignol et al. |
| 2009/0161770 | A1 | 6/2009 | Dong et al. |
| 2009/0257492 | A1 | 10/2009 | Andersson et al. |
| 2010/0034265 | A1 | 2/2010 | Kim et al. |
| 2010/0034268 | A1 * | 2/2010 | Kusakabe et al. ........ 375/240.15 |
| 2010/0111182 | A1 | 5/2010 | Karczewicz et al. |
| 2011/0243230 | A1 * | 10/2011 | Liu ........................ 375/240.14 |
| 2011/0249741 | A1 * | 10/2011 | Zhao et al. .............. 375/240.15 |
| 2012/0014436 | A1 * | 1/2012 | Segall et al. ............ 375/240.12 |
| 2012/0039388 | A1 * | 2/2012 | Kim et al. ................. 375/240.03 |
| 2012/0287998 | A1 * | 11/2012 | Sato ........................ 375/240.12 |

OTHER PUBLICATIONS

"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.

"Overview; VP7 Data Format and Decoder". Version 1.5. On2 Technologies, Inc. Dated Mar. 28, 2005.

"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.

"VP6 Bitstream & Decoder Specification". Version 1.02. On2 Technologies, Inc. Dated Aug. 17, 2006.

"Series H: Audiovisual and Multimedia Systems; Infrastructure of audiovisual services—Coding of moving video". H.264. Amendment 2: New profiles for professional applications. International Telecommunication Union. Dated Apr. 2007.

"VP6 Bitstream & Decoder Specification". Version 1.03. On2 Technologies, Inc. Dated Oct. 29, 2007.

"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.

"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.

"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.

"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.

Murat A. Tekalp, Block-Based Methods, Digital Video Processing, Prentice Hall Processing Series, Aug. 12, 1995, pp. 98-116, Prentice Hall PTR.

On2 Technologies Inc., White Paper TrueMotion VP7 Video Codec, Jan. 10, 2005, 13 pages, Document Version: 1.0, Clifton Park, New York.

On2 Technologies, Inc., White Paper On2's TrueMotion VP7 Video Codec, Jul. 11, 2008, pp. 7 pages, Document Version:1.0, Clifton Park, New York.

Series H: Audiovisual and Multimedia Systems, Infrastructure of audiovisual services—Coding of moving video, Video coding for low bit rate communication, International Telecommunication Union, ITU-T Recommendation H.263, Feb. 1998, 167 pp.

\* cited by examiner

US 8,798,131 B1

APPARATUS AND METHOD FOR ENCODING VIDEO USING ASSUMED VALUES WITH INTRA-PREDICTION

CROSS REFERENCE TO RELATED APPLICATIONS

This application claims priority to U.S. Provisional Patent Application Ser. No. 61/345,976, filed May 18, 2010, which is incorporated herein in its entirety.

TECHNICAL FIELD

The present disclosure relates in general to video encoding and decoding.

BACKGROUND

An increasing number of applications today make use of digital media for various purposes including, for example, remote business meetings via video conferencing, high definition video entertainment, video advertisements, and sharing of user-generated videos. As technology is evolving, users have higher expectations for media quality and, for example, expect high resolution video even when transmitted over communications channels having limited bandwidth.

To permit transmission of digital video streams while limiting bandwidth consumption, a number of video compression schemes have been devised, including formats such as VPx, promulgated by Google, Inc. of Mountain View, Calif., and H.264, a standard promulgated by ITU-T Video Coding Experts Group (VCEG) and the ISO/IEC Moving Picture Experts Group (MPEG), including present and future versions thereof. H.264 is also known as MPEG-4 Part 10 or MPEG-4 AVC (formally, ISO/IEC 14496-10).

SUMMARY

Disclosed herein are exemplary approaches for encoding video using assumed values with intra-prediction.

In one exemplary approach a method for encoding a video stream having a plurality of frames, each frame having a plurality of blocks is disclosed. The method can include selecting a current block from a current frame of the plurality of frames, the current block being in at least one of a top row or a left column of the current frame, determining one or more assumed values based on a prediction mode of the current block, creating a residual block using the current block, prediction mode of the current block, and the one or more determined assumed values, and encoding the current block using the residual block.

In another exemplary approach, a computing device for encoding a video stream having a plurality of frames, each frame having a plurality of blocks is disclosed. The computing device includes a memory and a processor configured to execute instructions stored in the memory to: select a current block from a current frame of the plurality of frames, the current block being in at least one of a top row or a left column of the current frame, determine one or more assumed values based on a prediction mode of the current block, create a residual block using the current block, prediction mode of the current block, and the one or more determined assumed values, and encode the current block using the residual block.

These and other exemplary approaches will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
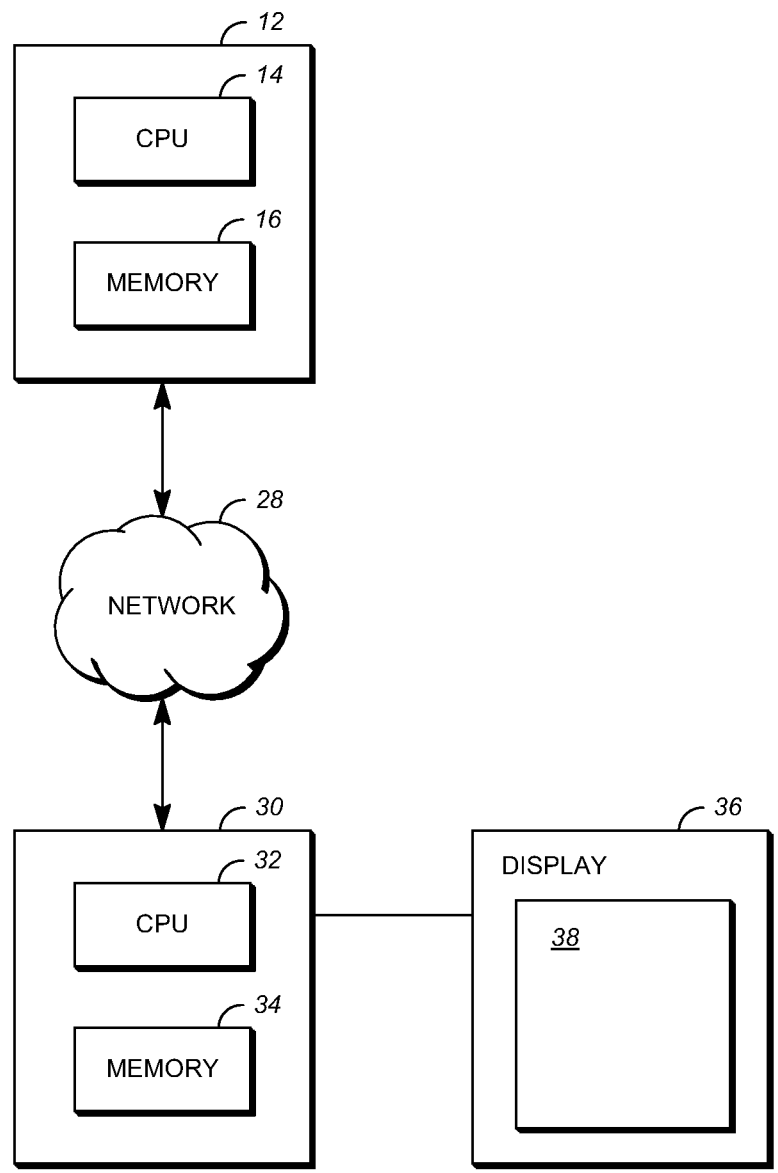
FIG. 1 is a schematic of a video encoding and decoding system.

FIG. 1 is a diagram of an encoder and decoder system 10 for still or dynamic video images. An exemplary transmitting station 12 may be, for example, a computer having an internal configuration of hardware including a processor such as a central processing unit (CPU) 14 and a memory 16. CPU 14 can be a controller for controlling the operations of transmitting station 12. The CPU 14 is connected to memory 16 by, for example, a memory bus. Memory 16 may be random access memory (RAM) or any other suitable memory device. Memory 16 can store data and program instructions which are used by the CPU 14. Other suitable implementations of transmitting station 12 are possible.

A network 28 connects transmitting station 12 and a receiving station 30 for encoding and decoding of the video stream. Specifically, the video stream can be encoded by an encoder in transmitting station 12 and the encoded video stream can be decoded by a decoder in receiving station 30. Network 28 may, for example, be the Internet. Network 28 may also be a local area network (LAN), wide area network (WAN), virtual private network (VPN), or any other means of transferring the video stream from transmitting station 12.

Receiving station 30, in one example, may be a computer having an internal configuration of hardware include a processor such as a central processing unit (CPU) 32 and a memory 34. CPU 32 is a controller for controlling the operations of transmitting station 12. CPU 32 can be connected to memory 34 by, for example, a memory bus. Memory 34 may be RAM or any other suitable memory device. Memory 34 stores data and program instructions which are used by CPU 32. Other suitable implementations of receiving station 30 are possible.

A display 36 configured to display a video stream can be connected to receiving station 30. Display 36 may be implemented in various ways, including by a liquid crystal display (LCD) or a cathode-ray tube (CRT). The display 36 can be configured to display a video stream decoded by the decoder in receiving station 30.

Other implementations of the encoder and decoder system 10 are possible. For example, one implementation can omit the network 28 and/or the display 36. In another implementation, a video stream may be encoded and then stored for transmission at a later time by receiving station 12 or any other device having memory. In another implementation, additional components may be added to the encoder and decoder system 10. For example, a display or a video camera may be attached to transmitting station 12 to capture the video stream to be encoded.

Figure 2:
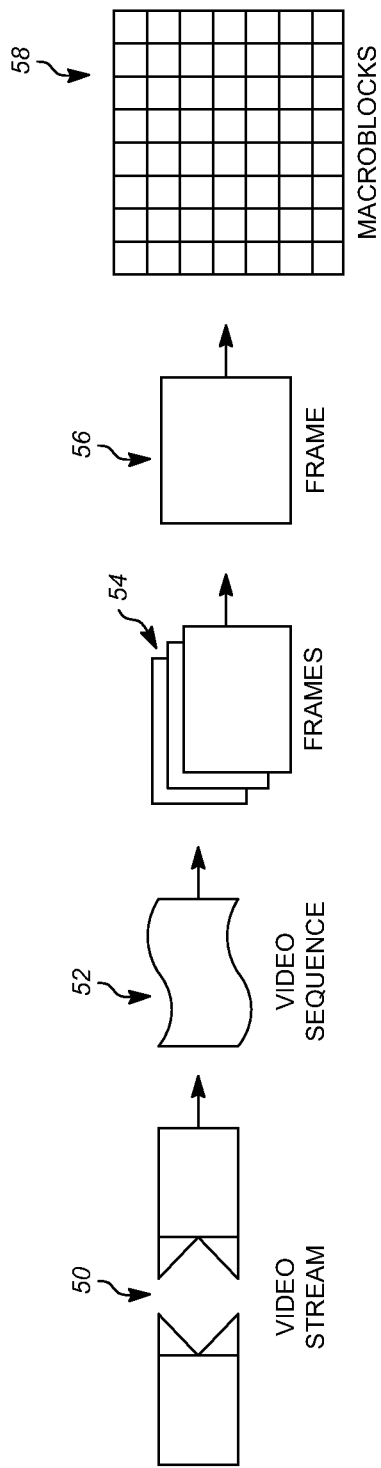
FIG. 2 is a diagram of a video bitstream.

FIG. 2 is a diagram a typical video stream 50 to be encoded and decoded. Video coding formats, such as VP8 or H.264, provide a defined hierarchy of layers for video stream 50. Video stream 50 includes a video sequence 52. At the next level, video sequence 52 consists of a number of adjacent frames 54, which can then be further subdivided into a single frame 56. At the next level, frame 56 can be divided into a series of blocks or macroblocks 58, which can contain data corresponding to, for example, a 16×16 block of displayed pixels in frame 56. Each block can contain luminance and chrominance data for the corresponding pixels. Blocks 58 can also be of any other suitable size such as 16×8 pixel groups or 8×16 pixel groups. Herein, unless otherwise stated, the terms macroblocks and blocks are used interchangeably.

Figure 3:
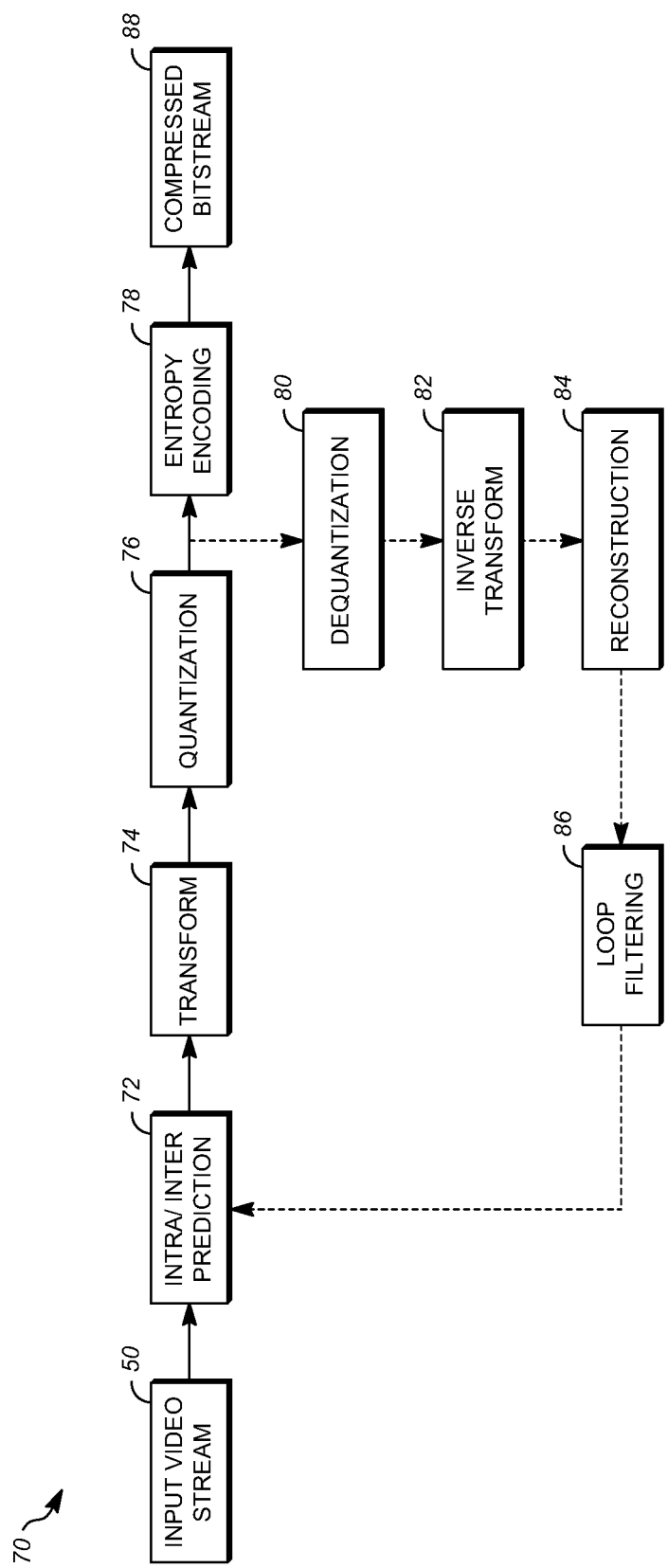
FIG. 3 is a block diagram of an encoder within the video encoding and decoding system of FIG. 1.

FIG. 3 is a block diagram of an encoder 70 within the video encoding and decoding system 10 of FIG. 1. An encoder 70 encodes an input video stream 50. Encoder 70 has the following stages to perform the various functions in a forward path (shown by the solid connection lines) to produce an encoded or a compressed bitstream 88: an intra/inter prediction stage 72, a transform stage 74, a quantization stage 76 and an entropy encoding stage 78. Encoder 70 also includes a reconstruction path (shown by the dotted connection lines) to reconstruct a frame for encoding of further macroblocks. Encoder 70 has the following stages to perform the various functions in the reconstruction path: a dequantization stage 80, an inverse transform stage 82, a reconstruction stage 84 and a loop filtering stage 86. Other structural variations of encoder 70 can be used to encode input video stream 50.

When input video stream 50 is presented for encoding, each frame 56 within input video stream 50 is processed in units of macroblocks. At intra/inter prediction stage 72, each macroblock can be encoded using either intra-frame prediction (i.e., within a single frame) or inter-frame prediction (i.e. from frame to frame). In either case, a prediction macroblock can be formed. In the case of intra-prediction, a prediction macroblock can be formed from samples in the current frame that have been previously encoded and reconstructed. In the case of inter-prediction, a prediction macroblock can be formed from samples in one or more previously constructed reference frames as described in additional detail herein.

Next, still referring to FIG. 3, the prediction macroblock can be subtracted from the current macroblock at stage 72 to produce a residual macroblock (residual). Transform stage 74 transforms the residual into transform coefficients in, for example, the frequency domain. Examples of block-based transforms include the Karhunen-Loève Transform (KLT), the Discrete Cosine Transform ("DCT") and the Singular Value Decomposition Transform ("SVD"). In one example, the DCT transforms the macroblock into the frequency domain. In the case of DCT, the transform coefficient values are based on spatial frequency, with the lowest frequency (i.e. DC) coefficient at the top-left of the matrix and the highest frequency coefficient at the bottom-right of the matrix.

Quantization stage 76 converts the transform coefficients into discrete quantum values, which are referred to as quantized transform coefficients or quantization levels. The quantized transform coefficients are then entropy encoded by entropy encoding stage 78. The entropy-encoded coefficients, together with the information required to decode the macroblock, such as the type of prediction used, motion vectors, and quantizer value, are then output to compressed bitstream 88.

The compressed bitstream 88 can be formatted using various techniques, such as run-length encoding (RLE) and zero-run coding.

The reconstruction path in FIG. 3 is present to ensure that both encoder 70 and a decoder 100 (described below) use the same reference frames to decode compressed bitstream 88. The reconstruction path performs functions that are similar to functions that take place during the decoding process that are discussed in more detail below, including dequantizing the quantized transform coefficients at dequantization stage 80 and inverse transforming the dequantized transform coefficients at an inverse transform stage 82 in order to produce a derivative residual macroblock (derivative residual). At reconstruction stage 84, the prediction macroblock that was predicted at intra/inter prediction stage 72 can be added to the derivative residual to create a reconstructed macroblock. A loop filter 86 can then be applied to the reconstructed macroblock to reduce distortion such as blocking artifacts.

Other variations of encoder 70 can be used to encode compressed bitstream 88. For example, a non-transform based encoder can quantize the residual signal directly without transform stage 74. In another embodiment, an encoder may have quantization stage 76 and dequantization stage 80 combined into a single stage.

Figure 4:
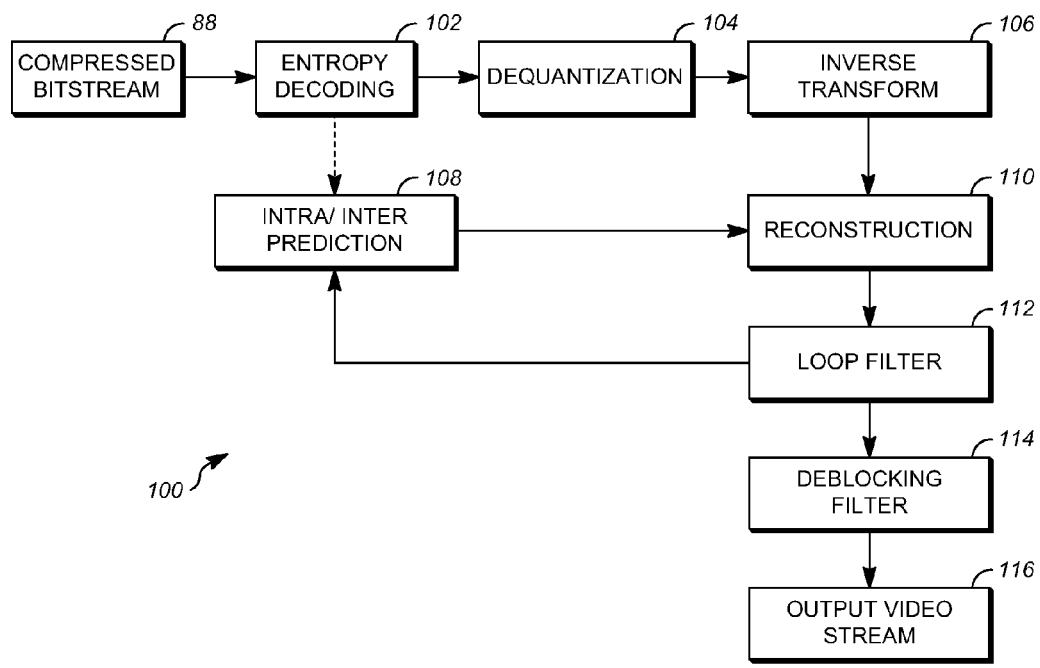
FIG. 4 is a block diagram of a decoder within the video encoding and decoding system of FIG. 1.

FIG. 4 is a block diagram of a decoder 100 within the video encoding and decoding system 10 of FIG. 1. Decoder 100, similar to the reconstruction path of the encoder 70 discussed previously, includes the following stages to perform various functions to produce an output video stream 116 from compressed bitstream 88: an entropy decoding stage 102, a dequantization stage 104, an inverse transform stage 106, an intra/inter prediction stage 108, a reconstruction stage 110, a loop filter stage 112 and a deblocking filtering stage 114. Other structural variations of decoder 100 can be used to decode compressed bitstream 88.

When compressed bitstream 88 is presented for decoding, the data elements within compressed bitstream 88 can be decoded by entropy decoding stage 102 (using, for example, Context Adaptive Binary Arithmetic Decoding) to produce a set of quantized transform coefficients. Dequantization stage 104 dequantizes the quantized transform coefficients, and inverse transform stage 106 inverse transforms the dequantized transform coefficients to produce a derivative residual that can be identical to that created by the reconstruction stage in the encoder 70. Using header information decoded from the compressed bitstream 88, decoder 100 can use intra/inter prediction stage 108 to create the same prediction macroblock as was created in encoder 70. At the reconstruction stage 110, the prediction macroblock can be added to the derivative residual to create a reconstructed macroblock. The loop filter 112 can be applied to the reconstructed macroblock to reduce blocking artifacts. Deblocking filter 114 can be applied to the reconstructed macroblock to reduce blocking distortion, and the result is output as output video stream 116.

Other variations of decoder 100 can be used to decode compressed bitstream 88. For example, a decoder may produce output video stream 116 without deblocking filtering stage 114.

Figure 5:
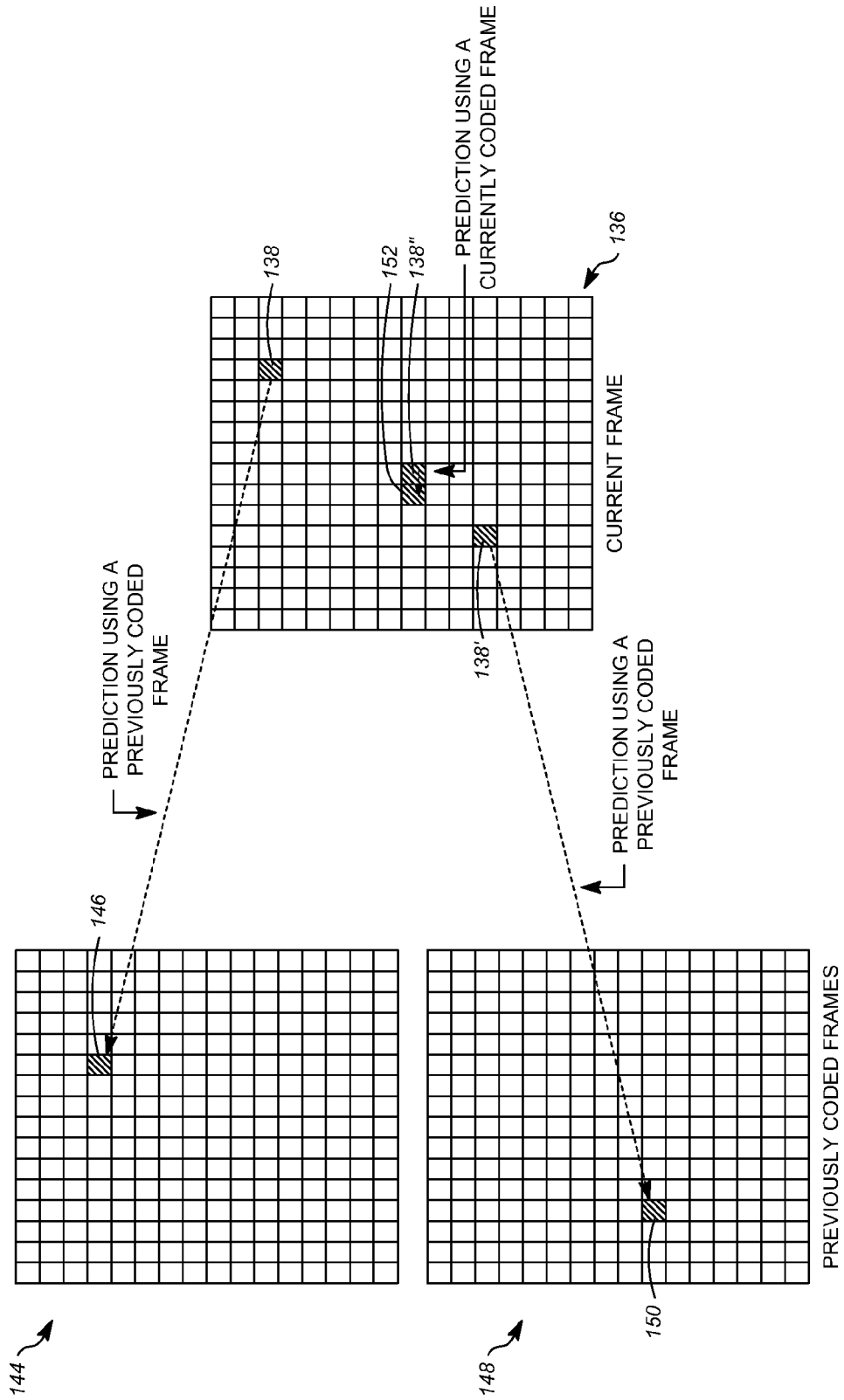
FIG. 5 is a schematic diagram of intra-prediction and inter-prediction used in the encoder and decoder of FIGS. 3 and 4.

FIG. 5 is a schematic diagram of intra-prediction and inter-prediction used in the encoder and decoder of FIGS. 3 and 4. As illustrated, FIG. 5 shows reference frames 144, 148 and a current frame 136 that is currently being encoded or decoded. As discussed previously, each frame can be processed in units of macroblocks at intra/inter prediction stage 72 or intra/inter prediction stage 108 and each macroblock can be coded using either intra prediction, inter prediction or some combination of inter prediction and intra prediction. For example, the current macroblock 136 is shown being encoded or decoded using inter prediction from a macroblock 146 from previously coded reference frame 144. Similarly, a current macroblock 138' is shown being encoded or decoded using inter prediction from a macroblock 150 from previously encoded reference frame 148. Also, for example, a current macroblock 138" is shown being encoded or decoded using intra prediction from a macroblock 152 within current frame 136.

Hereafter, the embodiments will be described using the term "blocks" which includes macroblocks as described previously. Blocks, like macroblocks, can be of any suitable size.

Inter prediction can utilize block-based motion estimation to compensate for movement of blocks each having, for example, M×N samples (e.g. 16×16) in the current frame. To predict the position of a current block (e.g. current block 138') in a current frame (e.g., frame 64), an area can be searched in a reference frame (e.g., previously coded frame 148) to find a best-matching block. The searched area or search window can be a region in the reference frame that is centered about the same coordinates as the current block in the current frame that is extended by a maximum displacement R. As such, the search window can have an area of (2R+M)×(2R+N). Block-based motion estimation is the process of using a search scheme to find the best-matching block in the search window on the basis of a matching criterion. In some instances, the matching criterion is a measure of error between a block in the search window and the current block, and the best matching block is a block in the search window that has the lowest measure of error. For example, the measure of error can be the mean squared error, mean absolute difference or, normalized cross-correlation function between the current block and the search window block. Other matching criteria are also possible.

The displacement between the current block and the best-matching block is saved as a motion vector for the current block. Subsequently, the best-matching block (i.e. the predictor) is subtracted from the current block to form the residual block. As discussed previously, both the residual block and the motion vector can be further processed and compressed (e.g., through transformation, quantization, and entropy encoding).

As discussed previously, intra prediction can use already-coded macroblocks within the current frame to approximate the contents of the current macroblock 138" (or another macroblock). Intra prediction can apply to intra-coded macroblocks in an inter-frame (i.e. a frame encoded with reference to prior frames) or to intra-coded macroblocks in an intra-frame (i.e. a frame encoded without reference to any other frame).

More specifically, intra prediction can use already-coded macroblocks within the current frame to approximate the contents of the current macroblock. It applies to intra-coded macroblocks in an inter-frame and to all macroblocks in a key frame. Relative to the current macroblock 138", the already-coded macroblocks can include all macroblocks in rows above the current macroblock 138" together with macroblocks in the same row as, and the left of the current macroblock 138".

The type of intra prediction performed on the current macroblock 138" can be, for example, determined by the type of intra prediction mode selected for that block. The chroma (U and V) and luma (Y) predictions for the current macroblock 138" can also be calculated independently of each other. Further, for example, in regard to chroma predictions, each of the chroma modes can treat U and V predictions identically (i.e. use the same relative addressing and arithmetic). However, in other embodiments, the U and V predictions may be different.

The encoder and decoder can code using, for example, an 8-bit per sample YUV 4:2:0 image format, although any other image format may be used (e.g. 4:4:4, 4:2:2, etc.). Accordingly each macroblock, such as current macroblock 138", can be a square array of pixels whose Y dimensions are 16×16 pixels and whose U and V dimensions are 8×8 pixels. Each macroblock can also be divided into 4×4 pixel subblocks. Of course, other suitable divisions of macroblocks (or another sized block) are also available.

Intra predictions can be performed on a chroma block (e.g., 8×8), a luma block (e.g. 16×16) or any other suitable block from, for example, one or more prediction modes. For example, a chroma block may be intra predicted using one of four prediction modes such as vertical prediction, horizontal prediction, DC prediction or True Motion prediction. Similarly, a luma block may be predicted using vertical prediction, horizontal prediction, DC prediction or True Motion prediction. Of course, other prediction modes are also available (e.g. southwest prediction, southeast prediction, vertical right diagonal prediction, vertical left diagonal prediction, horizontal down prediction, horizontal up prediction, etc.).

The description will generally refer to intra prediction of a block. The block may be, as discussed previously, a chroma block, luma block or any other suitable block of any suitable size. Use of the term block is intended to refer to any type of block and is not to be limited to any specific type or size block regardless of the examples of the embodiments shown and described hereinafter.

More particularly, vertical prediction fills each pixel row of the block with, for example, a copy of the row (hereinafter "Row A") lying immediately above the block (that is, the bottom row of the macroblock immediately above the current macroblock). Horizontal prediction fills each pixel column of the block with, for example, a copy of the column (hereinafter "Column L") lying immediately to the left of the block (that is, the rightmost column of the macroblock immediately to the left of the current macroblock. DC prediction fills the block with, for example, a single value based on the average of the pixels in Row A and Column L. True Motion prediction utilizes, in addition to the Row A and Column L, a pixel (hereinafter "Pixel P") above and to the left of the block. True Motion prediction can propagate the horizontal differences between pixels in Row A (starting from Pixel P), using the pixels from Column L to start each row. Alternatively, True Motion prediction can propagate the vertical differences between pixels in Column L (starting from Pixel P), using the pixels from Row A to start each column.

Because of their location in the frame, intra prediction for macroblocks in an upper row and/or a left column of the current frame have, in some cases, been intra predicted using, for example, one assumed value. This assumed value was the same regardless of the prediction mode being utilized. For example, a block of a macroblock located in the upper row of the frame, which is intra coded using vertical prediction, can assign one assumed value (e.g. 128) to all the rows of the block. Similarly, for example, a block of another macroblock located in a left column of the frame, which is intra coded using horizontal prediction, can also be assigned the same assumed value. Thus, regardless of the prediction mode used, the result would be, in these instances, intra predicted blocks with the same value.

In one implementation, for example, different assumed values can be assigned to Row A, Column L and/or Pixel P. Accordingly, even though assumed values are used, the prediction values can vary depending on the intra prediction mode.

FIGS. 6A-6D are schematic diagrams of intra-prediction modes used in macroblocks located an upper row and/or left column of a frame in the encoder and decoder of FIGS. 3 and 4.

Figure 6A:
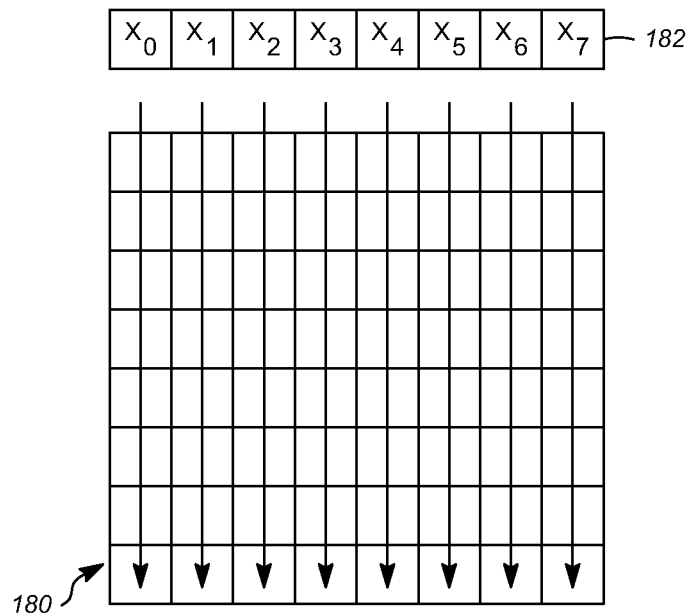
FIGS. 6A-6D are schematic diagrams of intra-prediction modes used in macroblocks located an upper row and/or left column of a frame in the encoder and decoder of FIGS. 3 and 4.

FIG. 6A illustrates an example of vertical prediction according to one embodiment for when a block 180 is located in an upper row of a frame. In this case, vertical prediction can fill each pixel row of the block with, for example, a copy of Row A 182. Row A 182 includes, for example, eight assumed pixel values $X_0$-$X_7$ lying (or assumed to be positioned) immediately above the block. Each of the $X_0$-$X_7$ pixel values can have the same assumed value such as 127. Of course, other suitable values are also available. Further, although $X_0$-$X_7$ are described as each having the same value, in other embodiments, one or more values of $X_0$-$X_7$ may differ.

Figure 6B:
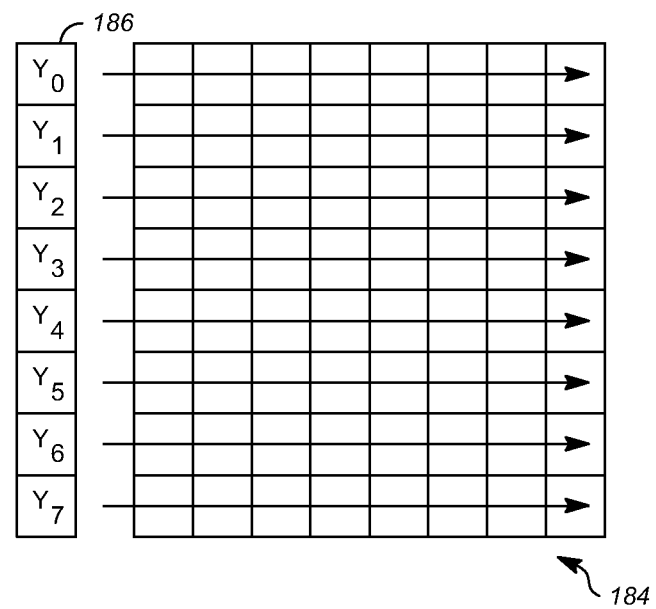

FIG. 6B illustrates an example of horizontal prediction according to one embodiment when a block 184 is located in a left column of a frame. In this case, horizontal prediction can fill each pixel column of the block with, for example, a copy of Column L 186. Column L 186 includes, for example, eight assumed pixel values $Y_0$-$Y_7$ lying (or assumed to be positioned) immediately to the left of the block. Each of the $Y_0$-$Y_7$ pixel values can have the same assumed value such as 129. Of course, other suitable values are also available. Further, although $Y_0$-$Y_7$ are described as each having the same value, in other embodiments, one or more values of $Y_0$-$Y_7$ may differ.

Figure 6C:
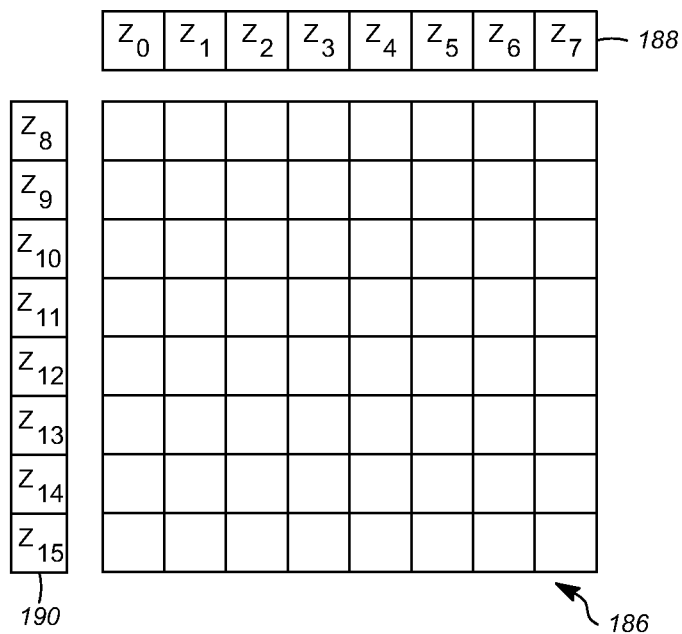

FIG. 6C illustrates an example of DC prediction according to one embodiment for when a block 186 is in a left column of a frame and/or an upper row of a frame. In the case where the block 186 is in the left column of the frame and the upper row of the frame, DC prediction can fill the block with, for example, a single assumed value such as 128. Of course, other suitable assumed values are also available. In the case where the block 186 is in the left column of the frame (and not in the upper row), DC prediction can fill the block with, for example, a single value based on the average of the pixel values $Z_0$-$Z_7$ (i.e. real values) in Row A 188. In the case where the block 86 is in the upper row of the frame (and not in the left column), DC prediction can fill the block with, for example, a single value based on the average of the pixel values $Z_8$-$Z_{15}$ (real values) in Column L 190. In contrast, in the case where the block 186 is not in the left column of a frame nor the upper row of the frame, DC prediction can fill the block with, for example, the average of the 16 pixel values (i.e. real values) in the above row A and the left column L.

Figure 6D:
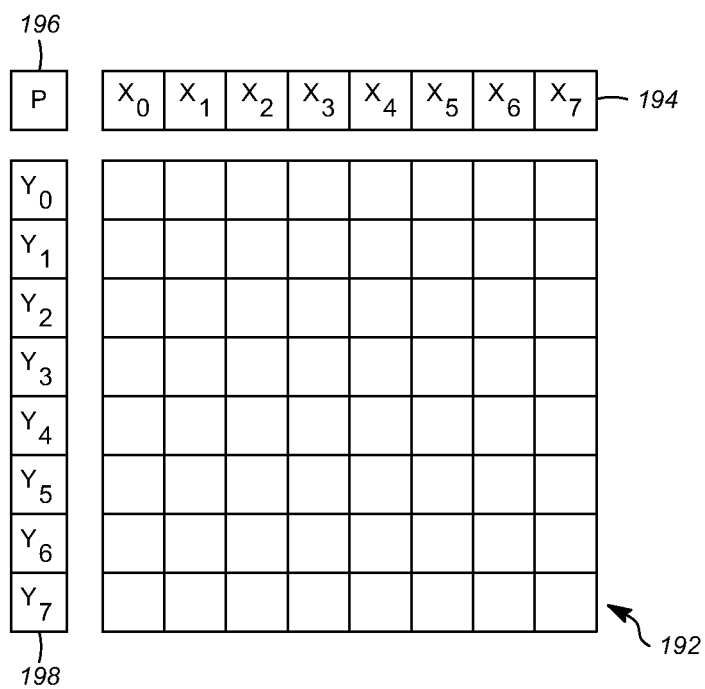

FIG. 6D illustrates an example of True Motion prediction according to one embodiment for when a block 192 is in a left column of a frame and/or an upper row of a frame. In the case where the block 192 is in the left column of the frame and the upper row of the frame, True Motion prediction can propagate the horizontal differences between pixels in Row A 194 (starting from an assumed Pixel P 196), using the pixels from Column L 198 to start each row. As discussed previously, in an alternative embodiment, True Motion prediction can propagate the vertical differences between pixels in Column L 198 (starting from Pixel P 196), using the pixels from Row A 194 to start each column. Row A 194 includes, for example, eight assumed pixel values $X_0$-$X_7$ lying (or assumed to be positioned) immediately above the block and column L 198 includes, eight assumed pixel values $Y_0$-$Y_7$ lying (or assumed to be positioned) immediately to the left of the block. Each of the $X_0$-$X_7$ pixel values can have the same assumed value such as 127 and each of the $Y_0$-$Y_7$ pixel values can have the same assumed value such as 129. The assumed pixel value of P 196 can be the same as the eight assumed pixel values $X_0$-$X_7$ or another suitable value. Of course, other suitable values are also available. Further, although Row A 194 and Column L 196 and are described as each having different values, in other embodiments, one or more values of Row A 194 and Column L 196 may be the same.

In the case where the block 186 is in the left column of the frame (and not in the upper row), True Motion prediction can use the pixels from Column L 198 (and Pixel P 196) and the pixels in, for example, the last row of the block above block 196. In the case where the block 86 is in the upper row of the frame (and not in the left column), True Motion prediction can use the pixels from Row A 194 and the pixels in, for example, the last column of the block to the left of block 196.

Of course, although 8×8 blocks are shown in FIGS. 6A-6D, these blocks can also be any other suitable size. For example, in the case of a luma block, the block may have a size of 16×16. Additionally, if the block has a different size, Rows A and Columns L may also have different dimensions than that shown in FIGS. 6A-6D. For example, if the block is a size of 16×16, Row A can contain 16 pixels which, for example, have assumed values $X_0$-$X_{15}$.

Accordingly, even when the assumed values are used in the four modes described above, the encoder 70 and decoder 100 can differentiate between them by using different assumed values. By transferring the type of intra prediction mode in the bitstream, the decoder 100 can also intra predict using the assumed values (without necessarily transferring the assumed values themselves). Further, the use of different assumed values for in different prediction modes can result in several different values even for blocks that are intra coded using assumed values.

The operation of encoding and decoding can be performed in many different ways and can produce a variety of encoded data formats. The above-described embodiments of encoding or decoding may illustrate some exemplary encoding techniques. However, in general, encoding and decoding are understood to include any transformation or any other change of data whatsoever.

The embodiments of transmitting station 12 and/or receiving station 30 (and the algorithms, methods, instructions etc. stored thereon and/or executed thereby) can be realized in a computing device including hardware, software, or any combination thereof including, for example, IP cores, ASICS, programmable logic arrays, optical processors, programmable logic controllers, microcode, firmware, microcontrollers, servers, microprocessors, digital signal processors or any other suitable circuit. In the claims, the term "processor" should be understood as encompassing any the foregoing, either singly or in combination. The terms "signal" and "data" are used interchangeably. Further, portions of transmitting station 12 and receiving station 30 do not necessarily have to be implemented in the same manner.

Further, in one embodiment, for example, transmitting station 12 or receiving station 30 can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

Transmitting station 12 and receiving station 30 can, for example, be implemented on computers in a screencasting system. Alternatively, transmitting station 12 can be implemented on a server and receiving station 30 can be implemented on a device separate from the server, such as a handheld communications device (i.e. a cell phone). In this instance, transmitting station 12 can encode content using an encoder into an encoded video signal and transmit the encoded video signal to the communications device. In turn, the communications device can then decode the encoded video signal using a decoder. Alternatively, the communications device can decode content stored locally on the communications device (i.e. no transmission is necessary). Other suitable transmitting station 12 and receiving station 30 implementation schemes are available. For example, receiving station 30 can be a personal computer rather than a portable communications device.

Further, all or a portion of embodiments of the present invention can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for encoding a video stream having a plurality of frames, each frame having a plurality of blocks, the method comprising:
   selecting a current block from a current frame of the plurality of frames, the current block being in at least one of a top row or a left column of the current frame;
   determining one or more assumed values based on a prediction mode of the current block without reference to other pixels;
   creating a residual block using the current block, the prediction mode of the current block, and the one or more determined assumed values, using a processor; and
   encoding the current block using the residual block.

2. The method of claim 1, wherein the prediction mode is one of horizontal prediction, vertical prediction, DC prediction, or True Motion prediction.

3. The method of claim 1, wherein at least one of the assumed values is 127 if the current block is in the top row of the current frame and at least one of the assumed values is 129 if the current block is in the left column of the current frame.

4. The method of claim 1, wherein creating the residual block comprises:
   creating a reference block by copying at least some of the assumed values into the reference block; and
   creating the residual block by taking a difference between the reference block and the current block.

5. The method of claim 4, wherein the prediction mode is horizontal prediction, the current block is in the left column of the current frame, and determining one or more assumed values comprises:
   determining a column of assumed values, the column having an assumed value associated with each row of pixels of the current block.

6. The method of claim 5, wherein creating the reference block comprises:
   creating the reference block by setting the value of at least one pixel in the reference block to the assumed value of the column of assumed values that is associated with the row of pixels of the at least one pixel.

7. The method of claim 4, wherein the prediction mode is vertical prediction, the current block is in the top row of the current frame, and determining one or more assumed values comprises:
   determining a row of assumed values, the row having an assumed value associated with each column of pixels of the current block.

8. The method of claim 7, wherein creating the reference block comprises:
   creating the reference block by setting the value of at least one pixel in the reference block to the assumed value of the row of assumed values that is associated with the column of pixels of the at least one pixel.

9. The method of claim 4, wherein the prediction mode is DC prediction and determining one or more assumed values comprises:
   determining a row of assumed values if the current block is in the top row of the current frame, the row having an assumed value associated with each column of pixels of the current block; and
   determining a column of assumed values if the current block is in the left column of the current frame, the column having an assumed value associated with each row of pixels of the current block.

10. The method of claim 9, wherein creating the reference block comprises:
    creating the reference block by setting the value of the pixels in the reference block to an average value of the row of assumed values and the column of assumed values if the current block is in the top row and left column of the current frame; and
    creating the reference block by setting the value of the pixels in the reference block to an average value of actual pixel values selected from a block to the left of the current block, a block above the current block, or both if the current block is not both in the top row and left column of the current frame.

11. The method of claim 4, wherein the prediction mode is True Motion prediction and determining one or more assumed values comprises:
    determining a row of assumed values if the current block is in the top row of the current frame, the row having an assumed value associated with each column of pixels of the current block;
    determining a column of assumed values if the current block is in the left column of the current frame, the column having an assumed value associated with each row of pixels of the current block; and
    determining an assumed pixel value.

12. The method of claim 11, wherein creating the reference block comprises:
    creating the reference block by setting the value of at least one pixel in the reference block equal to a value in the row of assumed values associated with the at least one pixel plus a value in the column of assumed values associated with the at least one pixel minus the assumed pixel value if the current block is in the top row and left column of the current frame;
    creating the reference block by setting the value of at least one pixel in the reference block equal to a value in a row of actual pixel values associated with the at least one pixel selected from a block above the current block plus a value in the column of assumed values associated with the at least one pixel minus the assumed pixel value if the current block is in the top row of the current frame; and creating the reference block by setting the value of at least one pixel in the reference block equal to a value in the row of assumed values associated with the at least one pixel plus a value in a column of actual pixel values associated with the at least one pixel selected from a block to the left of the current block minus the assumed pixel value if the current block is in the top row and left column of the current frame.

13. The method of claim 1, wherein determining one or more assumed values based on the prediction mode comprises:
   determining the one or more assumed values using one or more pre-determined values.

14. The method of claim 13, wherein the pre-determined values are common to both an encoder and a decoder.

15. The method of claim 1, further comprising:
   selecting the prediction mode for the current block.

16. A computing device for encoding a video stream having a plurality of frames, each frame having a plurality of blocks, the computing device comprising:
   a memory; and
   a processor configured to execute instructions stored in the memory to:
      select a current block from a current frame of the plurality of frames, the current block being in at least one of a top row or a left column of the current frame;
      determine one or more assumed values based on a prediction mode of the current block without reference to other pixels;
      create a residual block using the current block, the prediction mode of the current block, and the one or more determined assumed values; and
      encode the current block using the residual block.

17. The computing device of claim 16, wherein the prediction mode is one of horizontal prediction, vertical prediction, DC prediction, or True Motion prediction.

18. The computing device of claim 16, wherein at least one of the assumed values is 127 if the current block is in the top row of the current frame and at least one of the assumed values is 129 if the current block is in the left column of the current frame.

19. The computing device of claim 16, wherein the instructions to create the residual block includes instructions to:
   create a reference block by copying at least some of the assumed values into the reference block; and
   create the residual block by taking a difference between the reference block and the current block.

20. The computing device of claim 16, wherein the instructions to determine one or more assumed values based on the prediction mode includes instructions to:
   determine the one or more assumed values using one or more pre-determined values.

* * * * *